United States Patent [19]

Udelle et al.

[11] Patent Number: 5,755,183
[45] Date of Patent: May 26, 1998

[54] ANIMAL HAIR CONFINEMENT ENCLOSURE

[76] Inventors: Steven D. Udelle; Laura L. Udelle; Jessica J. Udelle, all of 13 Seasons Dr., Punta Gorda, Fla. 33983-5432

[21] Appl. No.: 456,718

[22] Filed: Jun. 1, 1995

Related U.S. Application Data

[63] Continuation-in-part of Ser. No. 196,700, Feb. 15, 1994.
[51] Int. Cl.⁶ ..................................... A01K 13/00
[52] U.S. Cl. ........................................ 119/622
[58] Field of Search ........................ 119/621, 622, 119/600

[56] References Cited

U.S. PATENT DOCUMENTS

| | | | |
|---|---|---|---|
| 2,865,329 | 12/1958 | Elliott | 119/622 |
| 2,976,841 | 3/1961 | Scheffer | 119/622 |
| 5,176,105 | 1/1993 | Madden | 119/622 |
| 5,517,946 | 5/1996 | Udelle et al. | 119/622 |

*Primary Examiner*—Thomas Price

[57] ABSTRACT

An animal hair confinement device comprising, a tubular shaped enclosure 10 lined with bristles 12, and slideable 31 onto a base 14 containing a strip of carpeting 22 on the base floor surface 16.

4 Claims, 8 Drawing Sheets

ANIMAL HAIR CONFINEMENT ENCLOSURE

This invention has been filed under the Disclosure Document Program as Document No. 345,276 and is a continuation in part of Ser. No. 08/196/700 filed Feb. 15, 1994.

BACKGROUND OF THE INVENTION

1. Field of the Invention

The present invention relates generally to safe-guarding the home environment from the unhealthy distribution of domesticated animal hair, dander, dirt, flea eggs, lice, and ticks, particularly by trapping and confining within its interior, the unwanted pollutants and debris.

2. Background—Discussion of the Prior Art

With the current economy requiring two incomes to support a higher standard of living, more couples find that their animals are left at home unattended for longer periods of time. Most families more or less live with the problem of animal hair since there are no effective devices available on the market to solve the problem. The first problem is the constant evidence of animal hair throughout the home. The second problem is that certain parts of the upholstered furniture become rubbing posts, leaving accumulations of hair as well as the dirt from the animal's body. While many pets are strictly confined to the house, there are many pets permitted to be outdoors. This outdoor freedom not only adds additional dirt to the body hair, but the animal can carry fleas, lice, and ticks to the interior of the living environment. The problem is particularly bad in the sub-tropics where flea and tick infestation is rather prevalent.

There are many devices on the market for self-grooming of animals. Among the prior art devices is a device that attaches to the lower part of a wall. This device only provides another additional location for hair deposits, mainly on the floor, along with soiling of the walls from the animal's body. It is well known that during any type of brushing action performed by hand or self-brushing by an animal, a significant amount of hair falls from even the best brush, but considerably more so from the animal's self-brushing efforts.

Prior art devices are basically directed to two types of self grooming devices, one type is identified as a walk-through or crawl-through device. These are devices that the animal may walk or crawl through and brush, rake, or scratch itself during the walk-through process. These are shown for example in U.S. Pat. No. 2,865,329 to Elliot, U.S. Pat. No. 2,976,841 to Scheffer, and U.S. Pat. No. 4,301,766 to Piccone. The patents to Elliot and Scheffer are very similar in construction and purpose. It was found that with a device similar to Scheffer, it was necessary to add catnip as an incentive to promote interest. The results, after one month of observation, revealed an occasional penetration of the animal's body to the shoulders, at most, while in the act of scratching or rubbing on the grooming medium. Close examination of the floor below the device showed animal hair available for dispersion by air movement.

The natural instinct most pets have to conceal, or hide themselves in various places or recesses, is irresistible as long as these places or recesses are not threatening to their inherent psychology. The prior art is basically directed to two types of self-grooming devices. U.S. Pat. No. 4,301,766 to Piccone discloses a furniture device for cats comprising a basic housing design being generally rectangular and defining a plurality of circular apertures in the sides. Each aperture is designed to receive a frame which is annular and includes a grooming device such as a brushing or combing device extending inwardly across the opening. Individual structures are attached to each other. Brushes or combs do not effectively hold all hair yielded by an animal's coat. As an animal enters an opening containing a brush, substantial hair will fall from the exterior of the device to the floor. If the animal exits through the same opening with the same brush, hair already attached to the brush can be rolled forward on the brush in small clumps and fall to the floor if the brushes are not keep clean. These brush widths are very limited in retaining hair because of their lack of depth. As the animal enters the cubicle, passes through the brush, and rests on the cubicle floor, the loose hairs on the cubicle floor will readily adhere to the animal's under body and be carried out when the animal exits. There is no brushing means at the bottom of the annular rings to grip the hair as the animal exits the cubicle. This device does not exhibit the ability to successfully confine any significant amounts of hair, dander, dirt, flea eggs, fleas, lice, or ticks.

U.S. Pat. No. 4,807,569 to Leopold discloses a grooming device comprising a toothed plate securable to a wall, corner or other supporting fixture. An aperture plate having holes positioned to correspond to the location of the teeth on the toothed plate mesh with the teeth and cover a portion of each tooth for providing added strength to and stiffening of each tooth when closed, a teeth straightening function upon opening and closing the two plates and a teeth cleaning function upon opening of the plates. Although the teeth do contain some animal hair, most of the hair falls to the floor below the device, ready to become scattered by a simple passage of a human stirring the air or by use of a ceiling fan.

U.S. Pat. No. 4,907,540 to Reynolds discloses a device for removal of loose hair and fur balls from a cat having a frame mounted to a wall. Attached to the frame are two planar surfaces with catnip receptacles and a plurality of bristles. The plurality of bristles are of appropriate number, placement and size to catch and hold a cat's loose fur.

U.S. Pat. No. 5,176,105 to Madden discloses a grooming apparatus having a base portion, and a twisted wire connected to the base portion. Brush bristles are retained by and extend radially from the spiral twist of the wire for brushing a live animal as it passes against the bristles. As in the other prior art devices, any hair, debris or pollutants that may fall from the animal, will remain on the floor until the animal, or a draft of air scatters it throughout the environment.

In summary, none of the prior art devices have provided a positive solution to the above mentioned animal problems that seriously affects the many living environments where animals are kept.

SUMMARY OF THE INVENTION

Generally, the present invention comprises a structure in the form of a mailbox configuration. The interior of the enclosure supports a complete array of brush bristles or a rubbing medium throughout both vertical sides and top. The base of the enclosure has a plurality of recessed, slotted openings, which will allow surplus hair, dander, dirt, flea eggs, fleas, lice and ticks that might fall from rubbing medium, or animal, to fall to the bottom of these slotted openings for complete confinement to prevent carry out. In addition, a strip of plush carpeting is attached at both ends of the enclosure's base, to further the confinement of debris to the interior of the device and not the living environment.

It is therefore an object of the invention to materially enhance the human living environment of animal owners by reducing the amount of hair, dander, dirt and other airborne pollutants carried by domestic animals and associated with allergies.

It is another object of the invention to provide a device that would receive the entire body of an animal to insure entrapment of pollutants and debris.

It is a still further object of the invention to provide a device that can be made in many sizes, inexpensively, to accommodate any requirement.

Still another object of the invention is to provide a device constructed as one integral piece, compromising the enclosure, rubbing medium, and a base having a plurality of recessed, elongated slots for debris confinement and "paw-gripping".

Yet another object of the invention is to provide a device that serves as a substitute rubbing medium to protect furniture or other areas of the home.

Other advantages of the present invention will be readily understood by reference to the following detailed description when considered in connection with the accompanying drawings.

DETAILED DESCRIPTION OF THE INVENTION

Figure 1:
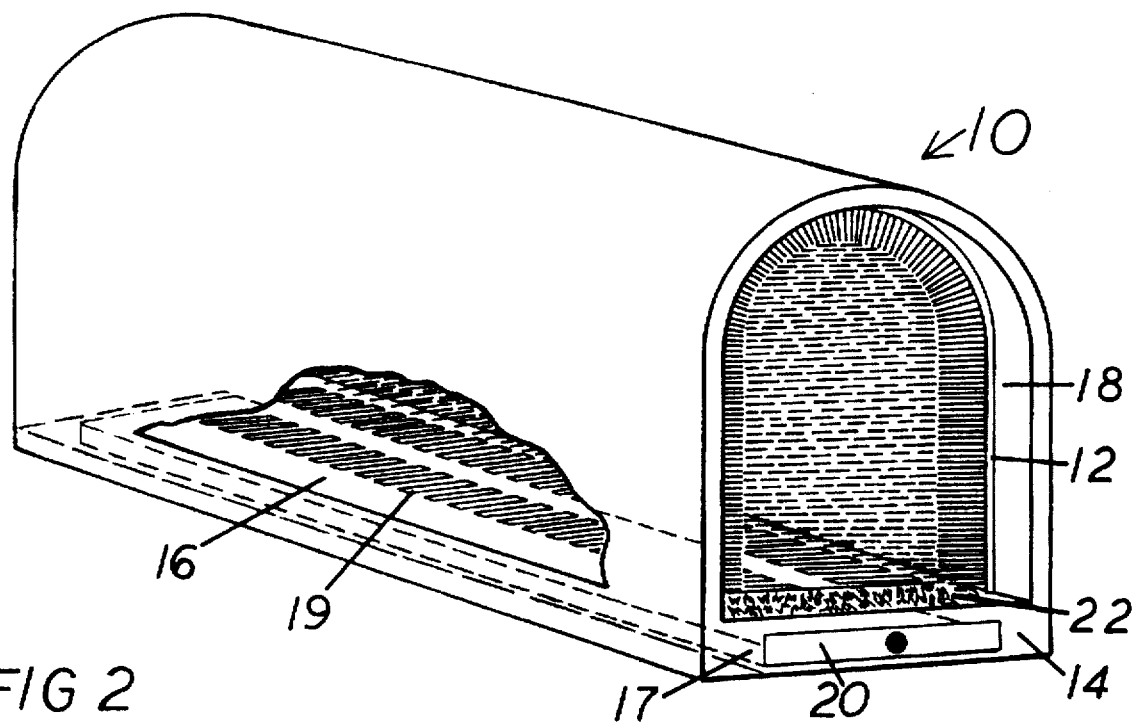
FIG. 1 is a perspective view, partially in section, of a preferred embodiment of the invention.
Figure 2:
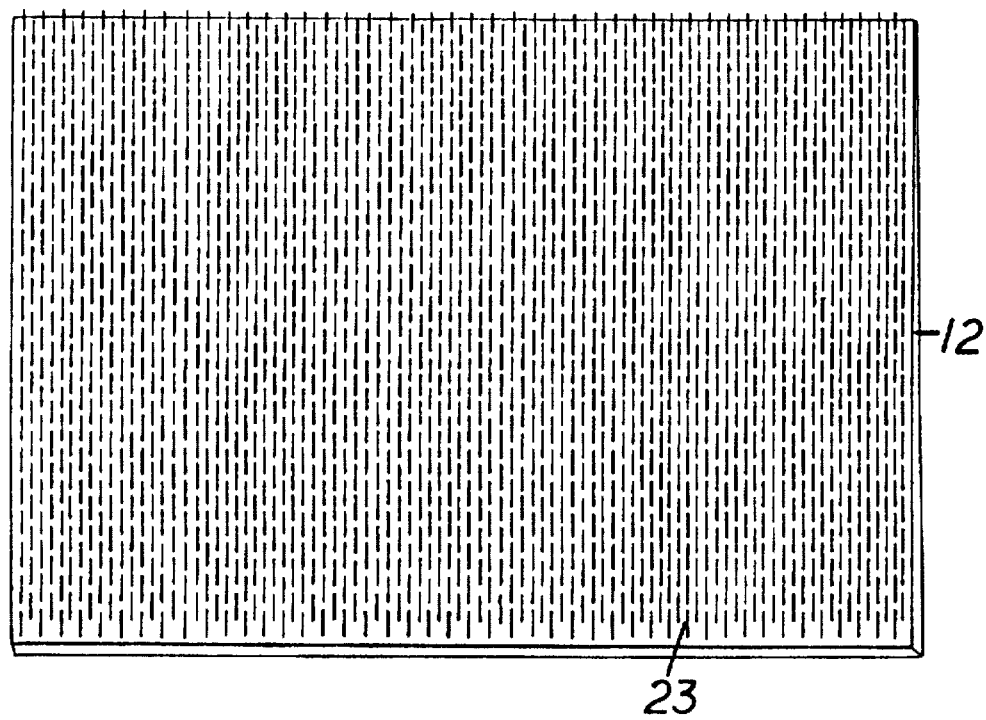
FIG. 2 is a perspective view of a flexible rubbing medium of the invention.

FIGS. 1 and 2 are perspective views of the animal hair confinement enclosure of the present invention and comprises a rigid enclosure 10, open at both ends, a flexible rubbing medium 12 that is removable, a base 14, a slotted or perforated base floor 16 supported in the base housing 14. The front of base 14 contains a slot 17 to accommodate a removable debris tray or drawer 20. A rubbing medium void area 18 is located at each end of the enclosure 10 and a narrow strip of plush carpeting 22 is attached to each of the extreme ends of the perforated base floor 16.

Rigid enclosure 10, formed in the shape of a mailbox, is sufficiently long to receive the entire animal, except the tail, to ensure the confinement of all debris released by the animal's rubbing act. Enclosure 10 may be formed from plastic or metal or other practical material, and sized to fit the average cat or dog size. Larger versions may be formed to accommodate larger animals. To simplify the vacuuming and sanitizing of accumulated animal debris from the brushing or rubbing medium 12, medium 12 is made removable by simply sliding it from the enclosure 10. Base-floor 16 is perforated or slotted to keep the floor 16 surface clear by passage of the animal debris through the slotted or perforated openings 19. The slotted or perforated openings 19 also provide a means for "paw-gripping".

Base 14 is designed to support the enclosure 10. The perforated base floor 16, and to house the debris tray 20. Debris tray 20, fits into tray guide 17, located below perforated base floor 16, and collects and confines the animal debris fallen from the brushing or rubbing medium 12 for easy disposal. The debris tray 20 may also be treated with flea powder to provide an added benefit of killing fleas and their eggs. The rubbing medium 12 is shorter than the enclosure 10 to provide a strip or void 18 at each end of enclosure 10 to prevent hair and debris from falling to the outside of the enclosure 10 when the animal is ribbing or scratching near the openings of the device.

Rubbing medium 12 shown in a flat condition in FIG. 2, may be made in a sheet of plastic or carpeting or suitable material with bristles 23 that are of sufficient stiffness to provide the brushing comfort desired by the animal and to pull the loose hairs or debris from the animal. The bristles 23 may also be designed to release hair and debris when the animal departs. The bristles 23 may also be formed integrally with the backing when molding rubbing medium 12 from certain materials.

Figure 3:
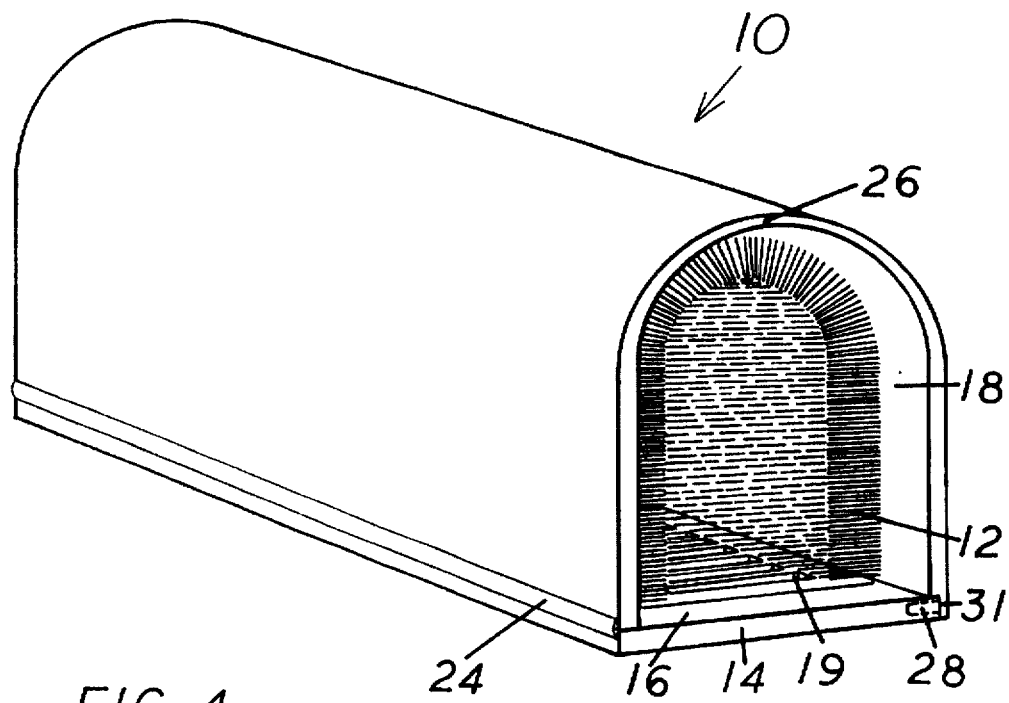
FIG. 3 is a perspective view of a second embodiment of the invention.
Figure 4:
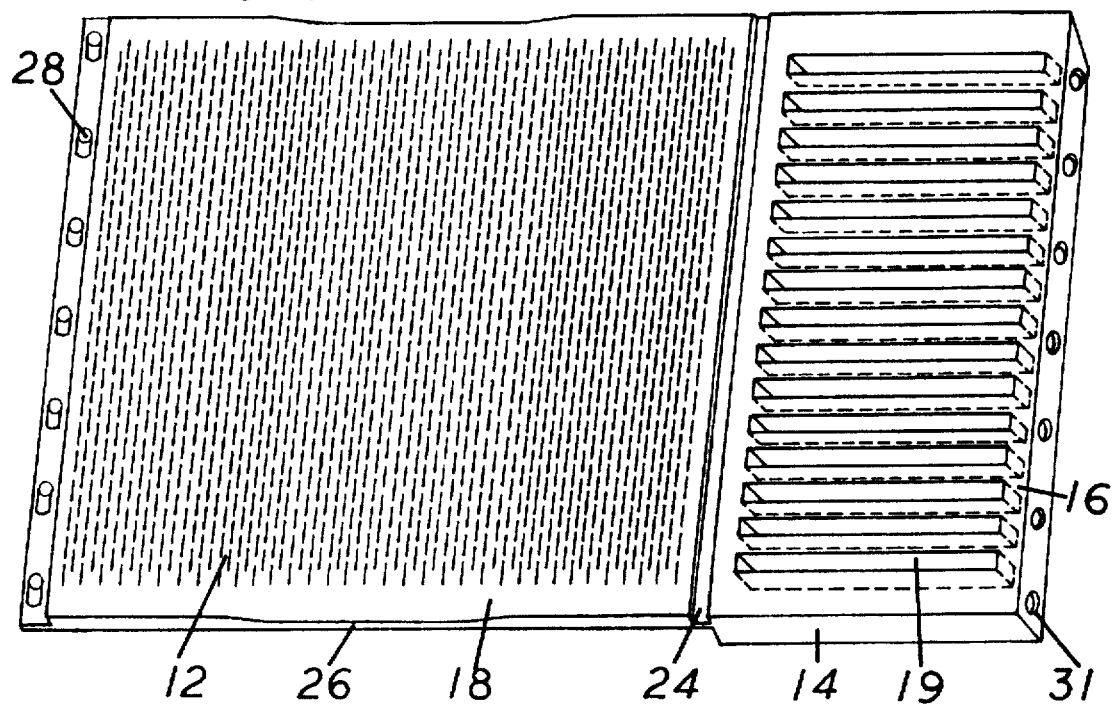
FIG. 4 is a perspective view of a disassembled second embodiment of the invention.

FIGS. 3 and 4 are perspective views of a second embodiment in an assembled form and an unassembled form comprising a flexible enclosure 10, a flexible rubbing medium 12, a rigid base 14, with perforated base floor 16, and with elongated openings 19 along the entire floor 16 surface. A flexible hinge 24 is formed on the entire length of the base 14, a rubbing medium void area 18 at both ends of the enclosure 10, a reduced thickness 26 of the upper most portion of the enclosure 10, a plurality of attachment dowels 28, and a plurality of attachment dowel openings 31 to form a mailbox configuration when assembled with all of the individual components made in one integral piece.

The enclosure 10 is made with a reduced thickness 26 to insure a correct bending moment for curving or shaping purposes thus enabling the enclosure 10 to assume its true shape when assembled. Elongated openings 19 in the base housing 14 keep the floor 16 clear of debris as well as a means for "paw-gripping". The base housing 14 provides a means of support and attachment for the flexible enclosure 10 as at hinge 24 and fastening dowels 28 to dowel openings 31 to complete its assembled form. A rubbing medium void 18 is also provided to prevent hair and debris from falling outside of the device when an animal is rubbing near either of the enclosure 10 openings.

Figure 5:
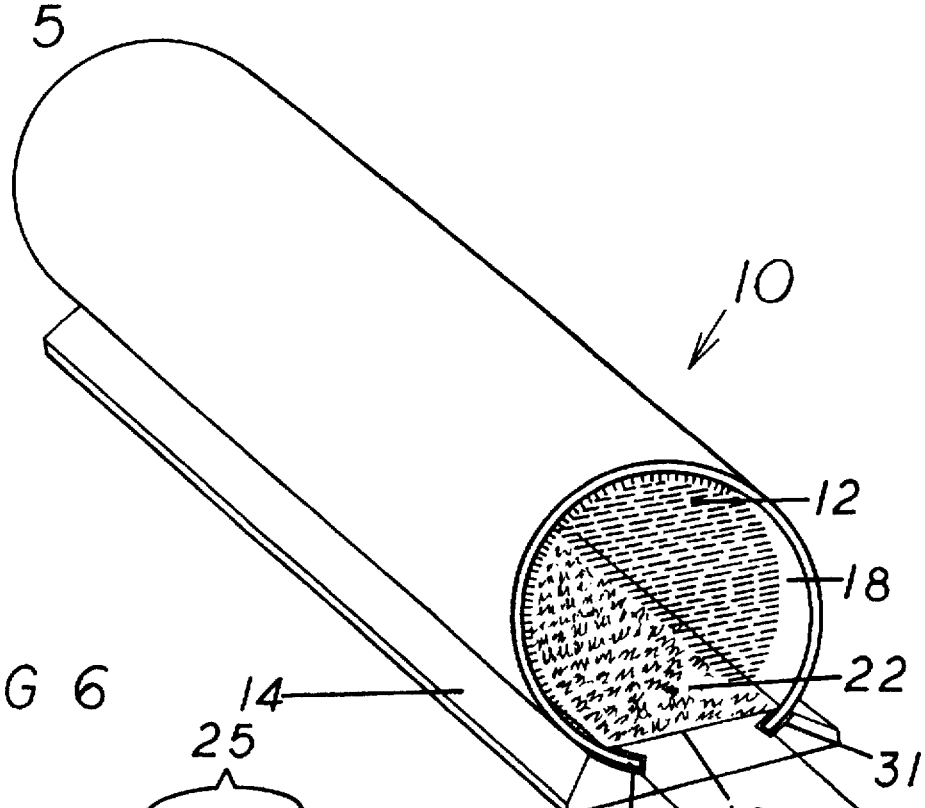
FIG. 5 is a perspective view of a third embodiment of the invention.

FIG. 5 is a perspective view of a third embodiment which comprises a tubular enclosure 10 and rubbing medium 12 as one integral unit, which may be inserted in or removed from the elongated guide tracks 31 of the base 14, a rubbing medium void area 18 and a strip of carpeting 22 the entire length of the base 14. This embodiment of enclosure 10 will house smaller animals such as hamsters, gerbils and mice in a practical manner. The rubbing medium 12 is an integral part of the enclosure 10 that traps and confines debris from the animal's rubbing motion. The base 14 is furnished with recessed, elongated tracks 31 for the attachment of the integrally made enclosure 10 and rubbing medium 12. The tracks 31 provide a convenient means for removing the tubular enclosure 10 for ease of cleaning. The plush carpet 22, extending the entire length of the base floor 14 is provided for debris retention and "paw-gripping".

Figure 6:
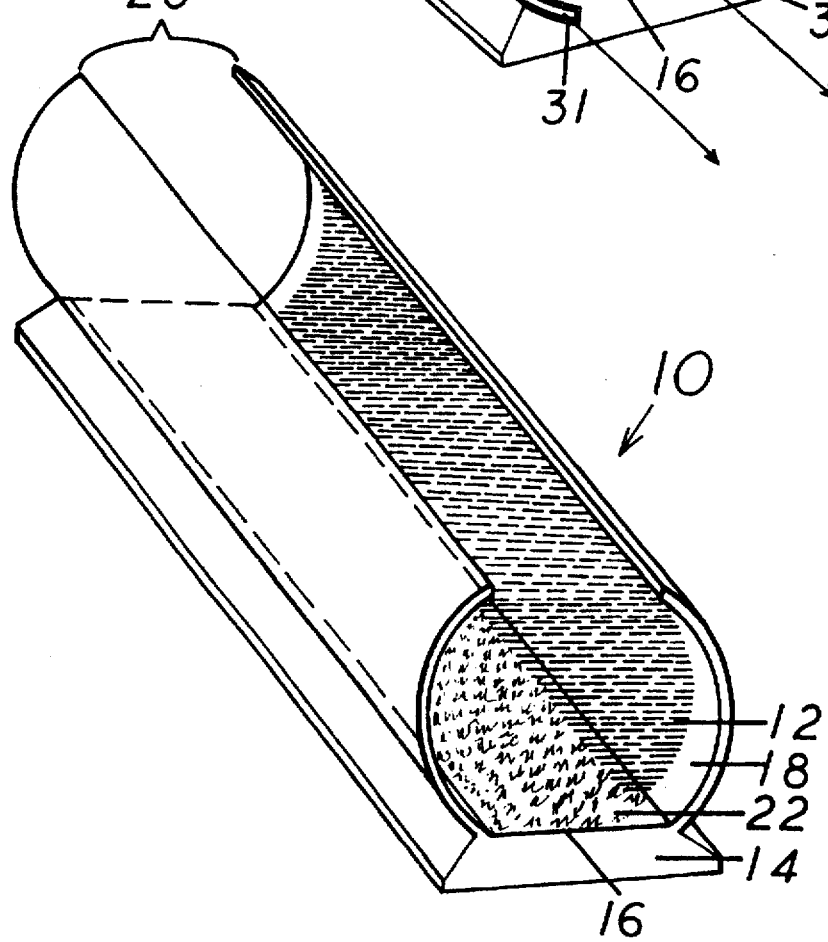
FIG. 6 is a perspective view of a fourth embodiment of the invention.

FIG. 6 is a perspective view of a fourth embodiment of the invention which comprises a rigid, tube-like enclosure 10 rubbing medium 12 and base 14 formed as one integral unit. The embodiment features an opening 25 of the uppermost portion of the enclosure 10 and a strip of plush carpeting 22 the entire length of the base floor 16 with a rubbing medium void area 18. The opening 25 is an elongated section removed from the top of the tubular or pipe enclosure 10, partially exposing the interior for human viewing and amusement as the animal uses the rubbing medium or for timid animals that will not use a completely enclosed space.

Figure 7:
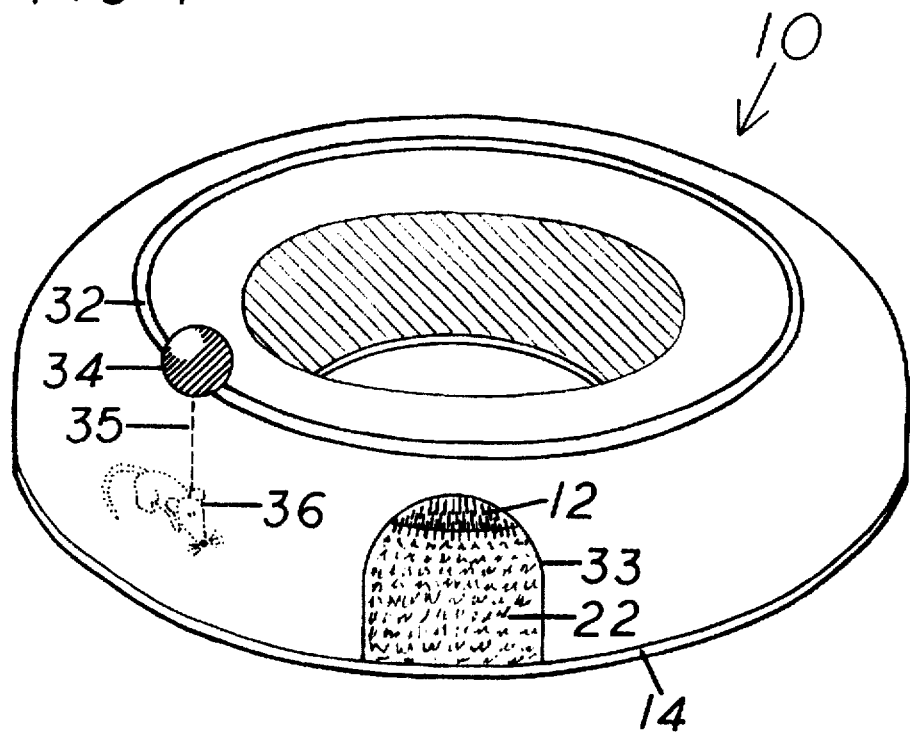
FIG. 7 is a fifth embodiment of the invention showing a "donut-shaped" enclosure.
Figure 8:
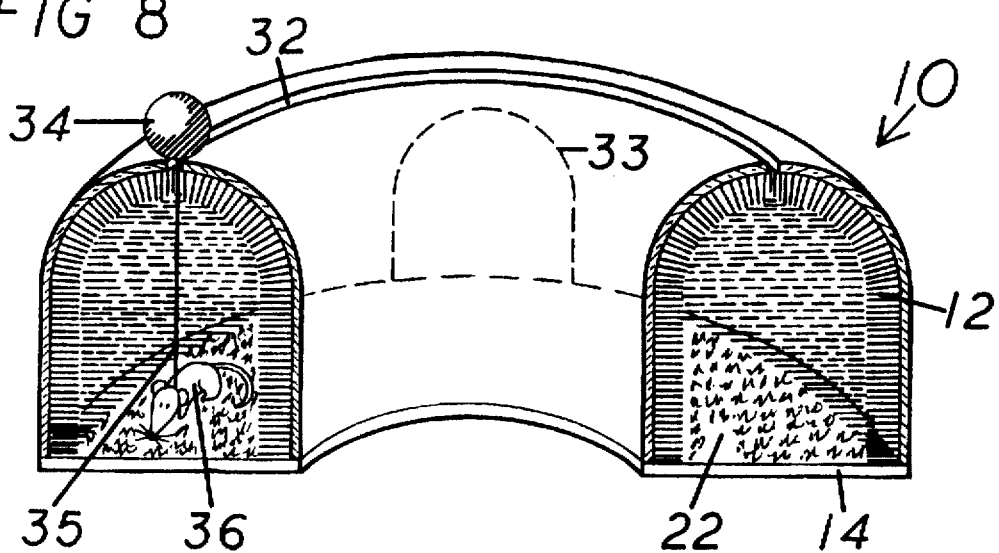
FIG. 8 is a perspective view, in section, of the embodiment shown in FIG. 7.
Figure 9:
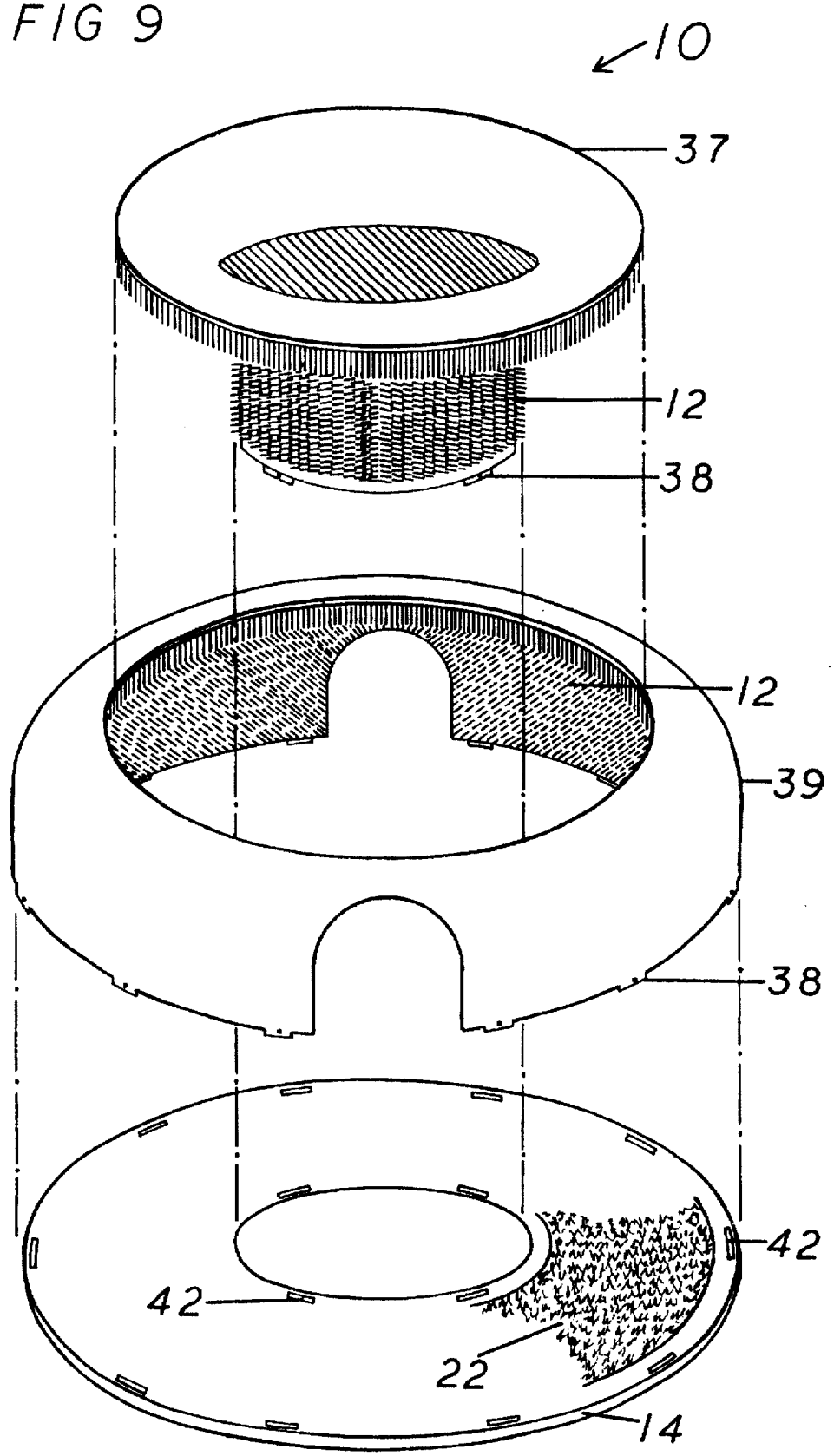
FIG. 9 is an exploded perspective view of the embodiment shown in FIG. 7.

FIGS. 7–9 are several views of a fifth embodiment which comprises a split circle or donut shaped enclosure 10 with a plurality of openings, including an open lure slot 32 and entrances 33. The circular shaped enclosure 10 comprises a circular base 14, a rubbing medium 12, permanently attached to the interior walls and top of enclosure 10, a carpet 22 fastened throughout the base floor 14, and an open slot 32 formed at the top end of the enclosure. A lure handle 34, for manipulating a lure 36 riding on a breakable string 35 is suspended through the open slot 32. As shown in FIG. 9, the enclosure 10 is shown in an exploded view with the inner enclosure portion 37, the outer enclosure portion 39, circular base 14, and rubbing medium 12, permanently installed therein to both sides and the top. Each of the parts of the enclosure 10, the inner enclosure portion 37 and the outer enclosure portion 39 are fastened to the base 14 with attachment blades 38 which are inserted into attachment blade openings 42 which are used as fasteners to firmly secure the enclosure 10 assembly to the base 14. A plush type carpet 22 is attached to the entire floor area of the base 14 for containing fallen debris from the rubbing animal as it embeds or adheres to the thick nap of the carpet. The carpet 22 also serves as a means for "paw-gripping".

Figure 10:
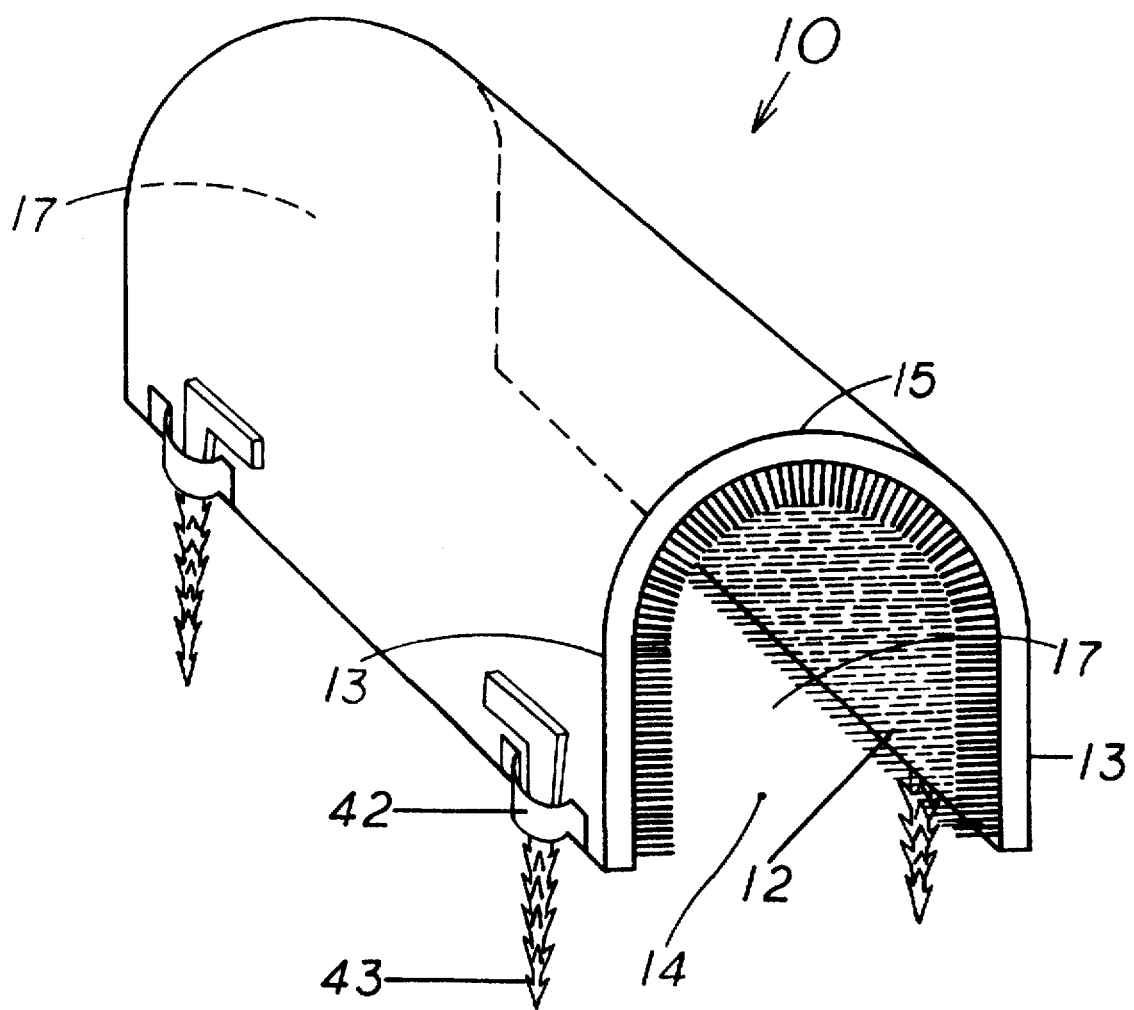
FIG. 10 is a perspective view of rigid, preformed rubbing medium with ground anchors.

FIG. 10 discloses a rigid, preformed enclosure 10 and rubbing medium 12 in a mailbox configuration, without a base 14, which may be anchored to the ground by inserting mounting pegs 43 into mounting brackets 42 and fastening the pegs 43 into the ground. Enclosure 10 without the base 14 may be anchored to the ground for the benefit of outdoor domestic animals or animals in a zoo habitat to maintain a better coat, as a means of "self-scratching" for flea and tick removal or satisfaction and to improve the animal's appearance and general well-being.

Figure 11:
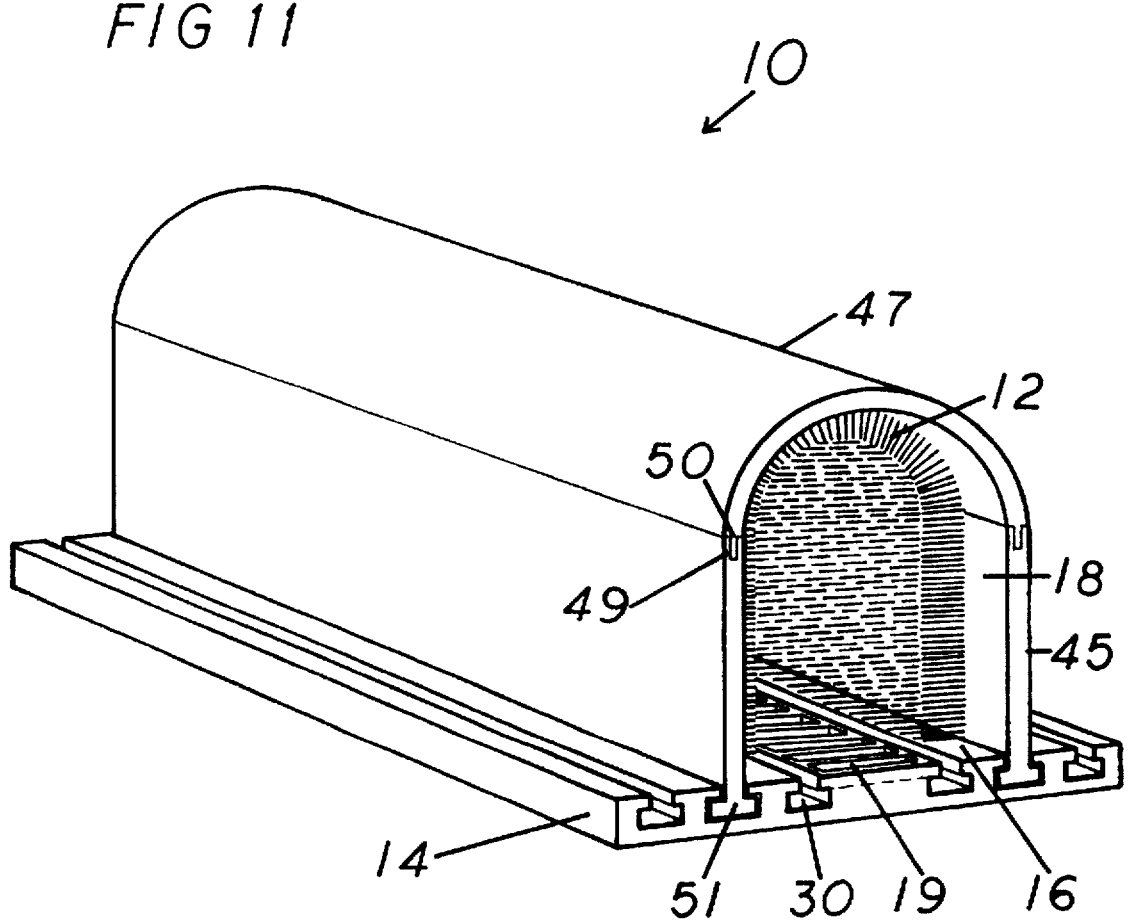
FIG. 11 is a perspective view of an expandable version of the invention.
Figure 12:
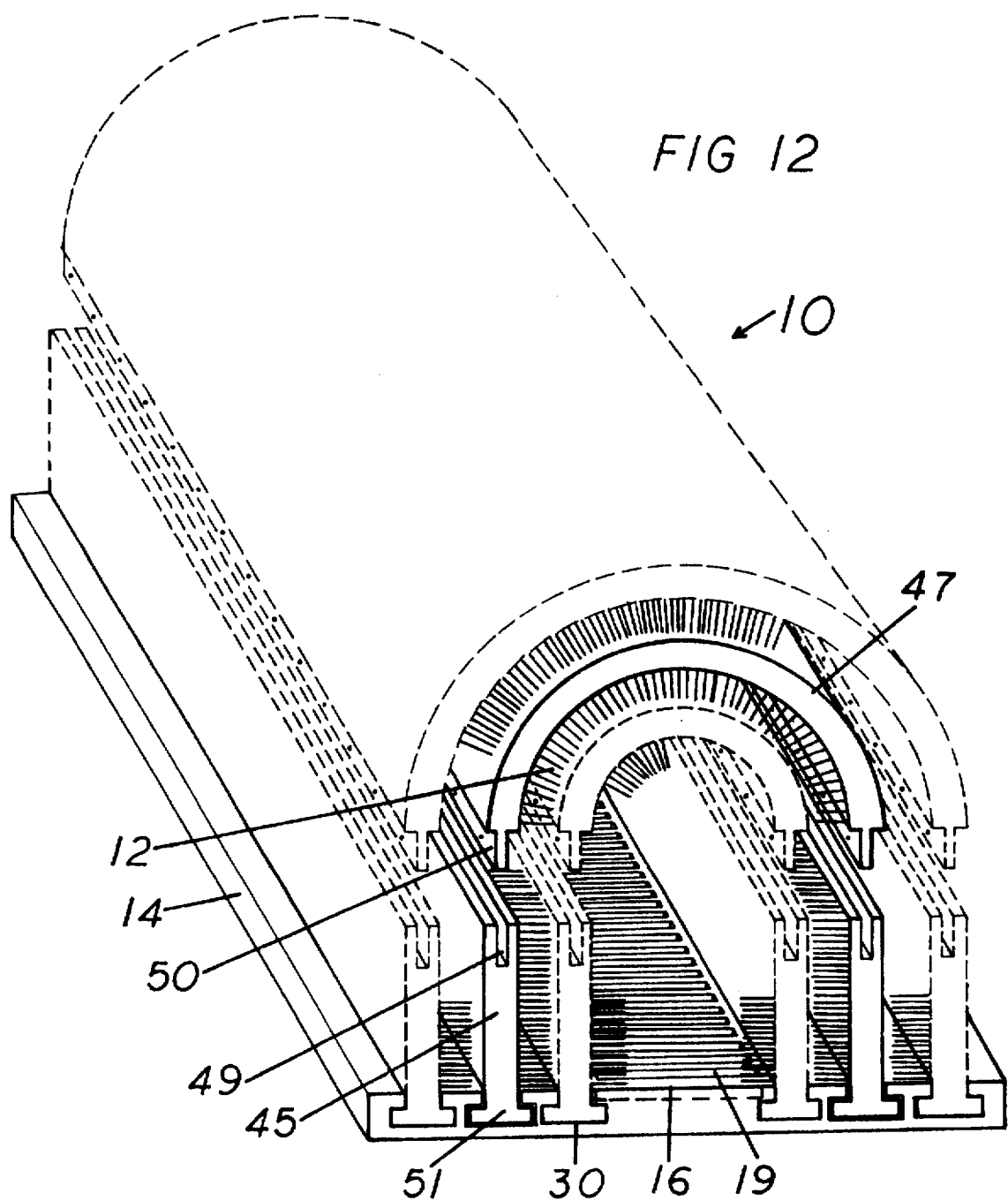
FIG. 12 is an exploded perspective view showing several sizes in dashed lines.

FIGS. 11 and 12 disclose an animal enclosure 10 which may be expanded to accommodate many sizes of animals. Housing base 14 contains a plurality of elongated tracks 30. Enclosure 10 comprises straight portions 45, curved portion 47, rubbing medium 12, and rubbing medium void 18. Perforated base floor 16 is provided to capture the hair and debris removed from the animal. FIG. 11 depicts the enclosure 10 with curved portion 47 sized for a medium size animal. Straight portions 45, have a rail 51 on the bottom edge for sliding in elongated tracks 30 and a slot 49 along the entire top edge which mates with insert edge 50 formed along each horizontal edge of curved portions 47.

FIG. 12 depicts an exploded view of the enclosure 10 with curved portion 47 sized for a medium size animal and the other two sizes are shown in dashed lines. To adjust the size of enclosure 10, the straight portion 45 are inserted into the appropriate size curved portion 47 is inserted into slots 49.

Thus it has been shown that the animal hair confinement enclosure of the present invention can perform all of the objectives outlined above more completely than any of the prior art devices. While the specification contains many specific details, these should not be construed as limitations on the scope of the invention, but rather as examples of embodiments herein detailed in accordance with the descriptive requirements of law, it should be understood that the details are to be interpreted as illustrative and not in a limiting sense.

What is claimed is:

1. An animal hair confinement device comprising:

a cylindrical-like enclosure having two opposed openings, an elongated opening extending between said opposed openings, a base means for supporting said enclosure thereon, and a plurality of bristles affixed to said enclosure substantially throughout the interior of said enclosure.

2. An animal hair confinement device comprising a cylindrical-like enclosure having two opposed openings, an elongated opening positioned between said opposed openings, a base means for receiving said elongated opening, and a plurality of bristles affixed to said enclosure substantially throughout the interior of said enclosure.

3. An animal hair confinement device of claim 2, further including two parallel, sufficiently spaced recessed grooves or tracks in an upper portion of said base means and extending along its entire length.

4. An animal hair confinement device of claim 2, further including said enclosure positioned in said recessed grooves.

* * * * *